United States Patent [19]

Lamplugh

[11] 4,250,005
[45] Feb. 10, 1981

[54] RADIATION CROSS-LINKED POLYURETHANE FOAMS

[75] Inventor: Roland J. Lamplugh, Chester, Pa.

[73] Assignee: Scott Paper Company, Philadelphia, Pa.

[21] Appl. No.: 716,081

[22] Filed: Aug. 20, 1976

Related U.S. Application Data

[60] Continuation of Ser. No. 404,812, Oct. 9, 1973, abandoned, which is a division of Ser. No. 258,488, Jun. 1, 1972, abandoned.

[51] Int. Cl.³ .................... C08G 18/04; C08J 7/18
[52] U.S. Cl. .................... 204/159.15; 204/159.19; 521/108; 521/129; 521/130; 521/131; 521/132; 521/172
[58] Field of Search ............ 260/2.5 BE, 2.5 AN, 260/2.5 AP, 2.5 AJ, 859 R; 204/159.15, 159.19; 521/108, 129, 130, 131, 172

[56] References Cited

U.S. PATENT DOCUMENTS

| | | | |
|---|---|---|---|
| 2,642,403 | 6/1953 | Simon et al. | 260/2.5 AN |
| 2,952,593 | 9/1960 | Rubens | 204/159.2 |
| 3,650,669 | 3/1972 | Osborn et al. | 204/159.19 |
| 3,700,752 | 10/1972 | Hutchinson | 260/2.5 BE |
| 3,714,083 | 1/1973 | Nakayama et al. | 204/159.17 |

*Primary Examiner*—Wilbert J. Briggs, Sr.
*Attorney, Agent, or Firm*—Nicholas J. DeBenedictis; John W. Kane

[57] ABSTRACT

Polyurethane foams having modified properties, such as increased tensile strength, tear strength and improved compression-deflection characteristics are prepared by incorporating in a foam-forming composition, an effective amount of a cross-link promoter, selected from the group consisting of polyfunctional, polyunsaturated acrylates; polyfunctional, polyunsaturated methacrylates; triallyl cyanurate; methyl methacrylate; 1,5-cyclooctadiene and bis (β-chloroethyl) vinyl phosphonate. After a foam is prepared from the composition, it is exposed to a radiation dosage sufficient to modify the properties of said foam.

10 Claims, 1 Drawing Figure

RADIATION CROSS-LINKED POLYURETHANE FOAMS

This is a continuation of application Ser. No. 404,812, filed Oct. 9, 1973, in turn a divisional of Ser. No. 258,488, filed June 1, 1972, both now abandoned.

BACKGROUND OF THE INVENTION

1. Field of the Invention

The present invention relates generally to radiation cross-linked polyurethane foams, to a foam-forming composition useful in the preparation of said foams, and to a process for preparing said foams. More particularly, the present invention relates to a foam-forming composition comprising (a) a polyol selected from the group consisting of polyester polyols, polyether polyols having a molecular weight of about 1500 or less, and mixture of a polyester polyol and a polyether polyol wherein the polyester polyol has a molecular weight of from about 400 to about 5000 and the polyether polyol has a molecular weight of from about 250 to about 6500, (b) an organic polyisocyanate, and (c) a cross-link promoter selected from the group consisting of polyfunctional, polyunsaturated acrylates; polyfunctional, polyunsaturated methacrylates; triallyl cyanurate; methyl methacrylate; 1,5-cyclooctadiene and bis ($\beta$-chloroethyl) vinyl phosphonate.

Foams prepared from the above formulations are subjected to a suitable radiation source at a dosage and for a time sufficient to modify the properties of the foam. In this manner, foams having improved properties, such as increased tensile strength, tear strength and percent compression-deflection can be produced.

2. Description of the Prior Art

Foamed polyurethane materials derived from the reaction product of an organic polyisocyanate and an active-hydrogen containing compound such as polyols, including polyethers, polyesters, polyoxycarboxy alkylenes, and the like are well-known in the art. However, for certain applications it would be desirable to have a foam with properties different than those exhibited by conventional polyurethane foams. These desirable properties include improved dimensional stability both at ambient and at elevated temperatures, improved toughness, increased solvent resistance, greater resistance to creep, more permanent flame-proofness and greater impact resistance.

The crosslinking of polymeric materials by exposure to high intensity radiation and the use of a variety of materials as cross-link promoters have previously been disclosed. However, it has not heretofore been suggested that radiation cross-linked polyurethane foams could be prepared by the use of a specific group of crosslink promoters or that such foams would have modified properties.

SUMMARY OF THE INVENTION

In accordance with the present invention, polyurethane foams having modified properties such as increased tensile strength and tear strength and improved compression-deflection characteristics are prepared from a foam-forming composition comprising (a) a polyol selected from the group consisting of polyester polyols, polyether polyols having a molecular weight of about 1500 or less and mixtures of polyester and polyether polyols in which the polyester polyol has a molecular weight of from about 400 to about 5000 and the polyether polyol has a molecular weight of from about 250 to about 6500, (b) an organic polyisocyanate, and (c) A cross-link promoter selected from the group consisting of polyfunctional, polyunsaturated acrylates; polyfunctional, polyunsaturated methacrylates; triallyl cyanurate; methyl methacrylate; 1,5-cyclooctadiene and bis ($\beta$-chloroethyl) vinyl phosphonate.

DESCRIPTION OF THE PREFERRED EMBODIMENTS

Figure 1:
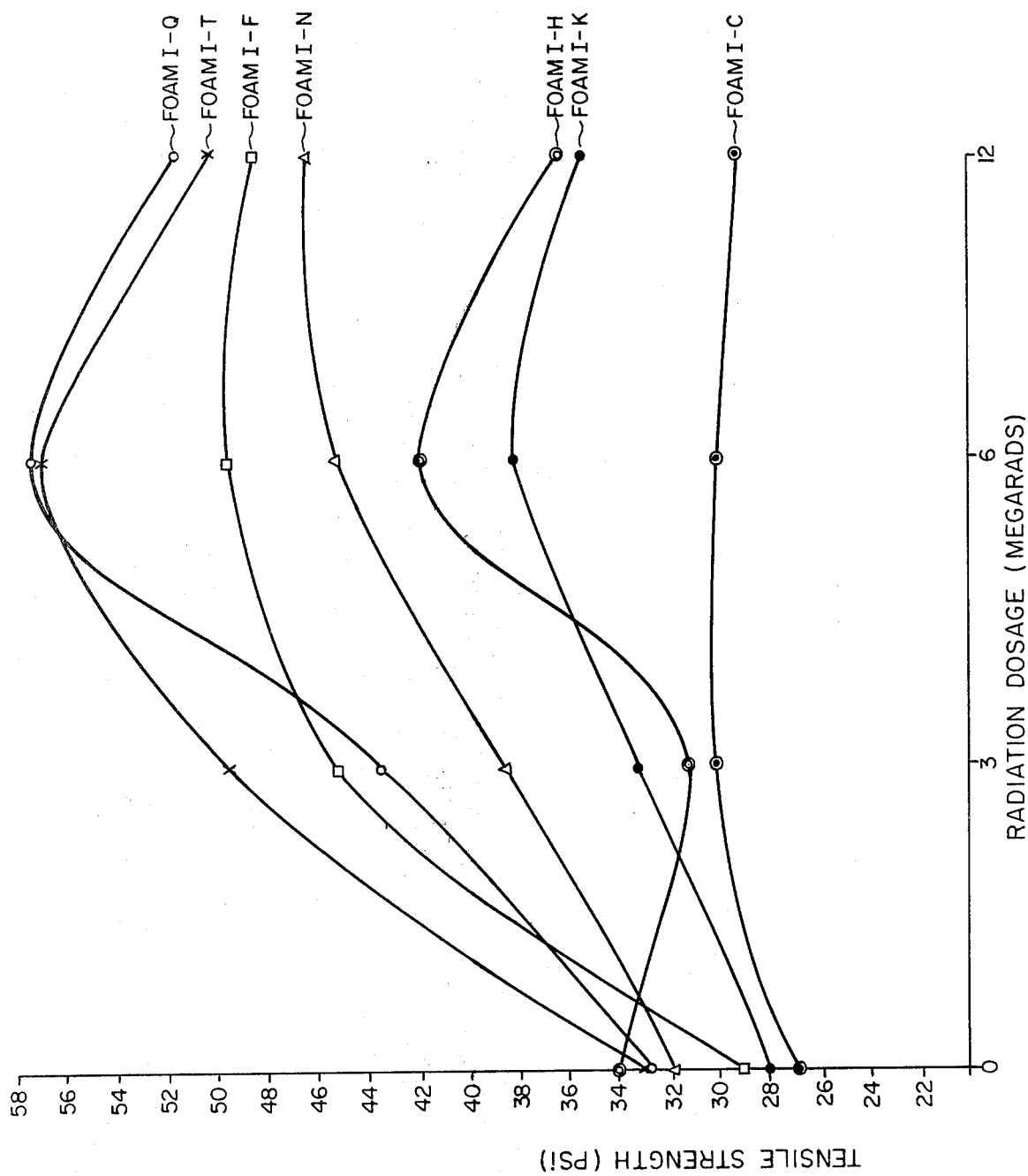
FIG. 1 is a graph illustrating the relationship between the radiation dosage applied to foams containing one of the above-mentioned cross-link promoters and the tensile strength of the resulting foams.

As described above, polyurethane foams having modified properties are prepared, in accordance with the present invention, from a composition comprising (a) a polyol, (b) an organic polyisocyanate, and (c) a cross-link promoter.

Each of these components is described in detail below.

Polyol

The polyol which is employed in carrying out the present invention may be selected from the group consisting of polyester polyols, polyether polyols having a molecular weight of about 1500 or less and mixtures of polyester and polyether polyols wherein the polyester polyol has a molecular weight of from about 400 to about 5000 and the polyether polyol has a molecular weight of from about 250 to about 6500.

Any polyester polyol conventionally employed in the preparation of polyurethane foam may be employed in preparing foams in accordance with the present invention. Representative polyester polyols which may be employed include, for example, the reaction product of polyfunctional organic carboxylic acids and polyhydric alcohols. Typical polyfunctional organic carboxylic acids which may be utilized in producing polyesters useful in carrying out the present invention include, for example, dicarboxylic aliphatic acids such as succinic, adipic, sebacic, azelaic, glutaric, pimelic and suberic acids and dicarboxylic aromatic acids such as phthalic acid, terephthalic acid, isophthalic acid and the like. Other polycarboxylic acids that can be employed include the "dimer acids" such as the dimer of linoleic acid. Hydroxyl-containing monocarboxylic acids such as ricinoleic acid may also be employed. Alternatively, the anhydrides of any of these acids can be employed in producing the polyesters. Typical polyhydric alcohols that may be reacted with the carboxylic acid to produce the polyester polyols include, for example, the monomeric polyhydric alcohols such as glycerol, 1,2,6-hexane triol, ethylene glycol, diethylene glycol, trimethylol propane, trimethylol ethane, pentaerythritol, propylene glycol, 1,3-butylene glycol, and 1,4-butylene glycol.

Polyether polyols may also be employed in preparing foams in accordance with the present invention. However, it has been found that not all polyether polyols conventionally employed in the preparation of polyurethane foams may be utilized. If a polyether polyol is the only polyol component of a foam-forming composition of the present invention it has been found that the polyether polyol must have a molecular weight equal to about 1500 or less. Representative polyether polyols which may be employed in preparing foams in accordance with the present invention include, for example, the polyalkylene oxide ethers, such as the reaction products of ethylene oxide, propylene oxide, butylene oxide, hexadecylene oxide, styrene oxide, picolene oxide or methyl glucoside, with a compound containing two or more reactive hydrogens, such as resorcinol, glycerol, trimethylol propane, pentaerythritol, ethylene glycol diethylene glycol, triethylene glycol, and the like. Particularly useful polyethers include polyoxypropylene glycol, polyoxyethylene glycol, polyoxybutylene glycol, polyoxyethyleneoxypropylene glycol, polyoxyethyleneoxybutylene glycol and polyoxypropyleneoxybutylene glycol.

As mentioned above, combinations of polyester polyols and polyether polyols may also be employed in the foam-forming compositions of the present invention. When combinations are employed any of the well-known polyester polyols conventionally employed in the preparation of polyurethane foams may be employed. These include all of the polyester polyols discussed above, most of which have a molecular weight in the range of from about 400 to about 5000. It is also possible, when a combination of polyols is employed, to utilize any of the polyether polyols which have been suggested for use in the preparation of polyurethane foams. These polyether polyols generally have a molecular weight in the range of from about 250 to about 6500.

Illustrative polyethers include the polyoxyalkylene polyols containing one or more chains of connected oxyalkylene groups which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide; and the polyoxybutylene glycols and copolymers such as polyoxyethyleneoxybutylene glycols and polyoxypropyleneoxybutylene glycols. Included in the term "polyoxybutylene glycols" are polymers of 1,2-butylene oxide, 2,3-butylene oxide and 1,4-butylene oxide. Other acyclic and alicyclic polyols which can be reacted with alkylene oxides, provide useful polyethers include glycerol, trimethylolpropane, 1,2,6-hexanetriol, pentaerythritol, sorbitol, glucosides, such as methyl, ethyl, propyl, butyl and 2-ethylhexyl arabinoside, xyloside, fructoside, glucoside, rhammoside, and the like, and polyethers prepared by the reaction of alkylene oxides with sucrose.

Further included are polyethers prepared by reacting an alkylene oxide with a mononuclear polyhydroxybenzene such as resorcinol, pyrogallol, phloroglucinol, hydroquinone, 4,6-di-t-butylcatechol, catechol, orcinol, methylphoroglucinol, 2,5,6-trimethylresorcinol, 4-ethyl-5,6-dimethylresorcinol, n-hexylresorcinol, 4-chloro-5-methylresorcinol, and the like; polyethers prepared by reacting 1,2-alkylene oxides or mixtures thereof with fused ring systems such as 3-hydroxy-2-naphthol, 6,7-dihydroxy-1-naphthol, 2-hydroxy-1-naphthol, 2,5-dihydroxy-1-naphthol, 9, 10-dihydroxyanthracene, 2,3-dihydroxyphenanthrene, and the like. Other polyethers which can be employed are those obtained by reacting alkylene oxides or mixtures thereof with polynuclear hydroxybenzenes such as the various di, tri, and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in the compound.

Exemplary diphenylol compounds include 2,2-bis(p-hydroxyphenyl) propane; bis(p-hydroxyphenyl)methane and the various diphenols and diphenylol methanes disclosed in U.S. Pat. Nos. 2,506,486 and 2,744,882, respectively.

Exemplary triphenylol compounds which can be employed include the alpha, alpha, omega-tris(hydroxyphenyl) alkanes such as:
1,1,3-tris(hydroxyphenyl)ethanes;
1,1,3-tris(hydroxyphenyl)propanes;
1,1,3-tris(hydroxy-3-methylphenyl)propanes;
1,1,3-tris(dihydroxy-3-methylphenyl)propanes;
1,1,3-tris(hydroxy-2,4-dimethylphenyl)propane;
1,1,3-tris(hydroxy-2,5-dimethylphenyl)propanes;
1,1,3-tris(hydroxy-2,6-dimethylphenyl)propane;
1,1,4-tris(hydroxyphenyl)butanes;
1,1,4-tris(hydroxyphenyl)butanes;
1,1,4-tris(hydroxyphenyl)-2-ethylbutanes;
1,1,4-tris(dihydroxyphenyl)butanes;
1,1,5-tris(hydroxyphenyl)-3-methylpentanes;
1,1,8-tris(hydroxyphenyl)octanes;
1,1,10-tris(hydroxyphenyl)decanes;
and the like.

Tetraphenylol compounds which can be reacted with the alkylene oxides include the alpha, alpha, omega, omega-tetrakis (hydroxyphenyl) alkanes such as:
1,1,2,2-tetrakis(hydroxyphenyl)ethanes;
1,1,3,3-tetrakis(hydroxy-3-methylphenyl)propanes;
1,1,3,3-tetrakis(dihydroxy-3-methylphenyl)propanes;
1,1,4,4-tetrakis(hydroxyphenyl)butanes;
1,1,4,4-tetrakis(hydroxyphenyl)-2-ethylbutanes;
1,1,5,5-tetrakis(hydroxyphenyl)pentanes;
1,1,5,5-tetrakis(hydroxyphenyl)-3-methylpentanes;
1,1,5,5-tetrakis(dihydroxyphenyl)pentanes;
1,1,8,8-tetrakis(hydroxy-3-butylphenyl)octanes;
1,1,8,8-tetrakis(dihydroxy-3-butylphenyl)octanes;
1,1,8,8-tetrakis(hydroxy-2,5-dimethylphenyl)octanes;
1,1,10,10-tetrakis(hydroxyphenyl)decanes;
and the corresponding compounds which contain substituent groups in the hydrocarbon chain such as:
1,1,6,6-tetrakis(hydroxyphenyl)-2-hydroxyhexanes;
1,1,6,6-tetrakis(hydroxyphenyl)-2-hydroxy-5-methylhexanes;
1,1,7,7-tetrakis(hydroxyphenyl)-3-hydroxyheptanes;
and the like.

Other useful polyethers which can be employed are the alkylene oxide, adducts of phenol-formaldehyde condensation products such as the novolaks. Novolaks are mixtures of polynuclear compounds having a diphenylmethane type structure such as 4,4'-dihydroxydiphenylmethane and 2,4'-dihydroxydiphenylmethane. Such compounds are free from methylol groups and are formed by the Baeyer reaction of phenol and formaldehyde. In a typical synthesis, novolaks are prepared by condensing one mole of a phenolic compound, such as phenol or cresol, with 0.8 mole of an aldehyde, such as formaldehyde or furfural, under acid conditions at a temperature of from about 160° C. to 170° C. The polynuclear products frequently contain four to eight units and can contain twelve or more units.

Further included are polyethers prepared by reacting one or more of the alkylene oxides mentioned above with acyclic polyamines such as ethylenediamine, propylenediamine, butylenediamine, pentylenediamine, hexylenediamine, octylenediamine, nonylenediamine, decylenediamine; polyalkylene polyamines such as diethylenetriamine, triethylenetriamine, tetraethylenepentamine, dipropylenetriamine, and the like. A particularly suitable polyether is the propylene oxide addition product of diethylenetriamine.

Other suitable polyethers include the alkylene oxide derivatives of primary aromatic amines such as: o-, m-, and p-phenylenediamine; 2,4- and 2,6-diaminotoluene; 2,6-diamino-p-xylene; 4,6-diamino-m-xylene; 2,4-diamino-m-xylene; 3,5-diamino-o-xylene; isohexyl-p-phenylenediamine; 3,5-diaminotoluene, and the like; polynuclear and fused aromatic polyamines such as 1,4-naphthylenediamine; 1,5-naphthylenediamine; 1,8-naphthylenediamine; benzidine, toluidine; 4,4'-methylenedianiline; 3,3'-dimethoxy-4,4'-biphenyldiamine; 3,3'-dichloro-4,4'-biphenyldiamine; 3,3'-dimethyl-4,4'-biphenyldiamine; 4,4'-ethylenedianiline, 4,4'-ethylidenedianiline; 1-fluorenamine; 2,5-fluorendiamine; 2,7-fluorenediamine; 1,4-anthradiamine; 3,3'-biphenyldiamine; 3,4-biphenyldiamine; 9,10-diaminophenanthrene; 4,4-diaminoazobenzene; 2,4,6-triaminotoluene; 2,3,5-triaminotoluene; 5,6-diaminoacenaphthlene, 4,4',4"-methylidynetrianile, 3,5-diaminobenzoic acid, triaminodiphenyl ethers and sulfides such as 2,4,4'-triaminodiphenyl ether; 2,3',4-triamino-4'-methyldiphenyl ether; 2,3',4-triamino-4'-methoxydiphenyl ether; and polyamines obtained by the reaction of aromatic amines with formaldehyde or other aldehydes.

The amount of polyester and polyether in the mixture can be varied over a wide range depending upon the properties desired in the foam product. Satisfactory results have been achieved, for example, with a ratio of polyester polyol to polyether polyol of from about 90 to 10 to about 10 to 90.

Organic Polyisocyanates

The term polyisocyanate as used herein, refers to any of the prior art polyisocyanates that have been or could be used to prepare polyurethanes. The term includes di- and polyisocyanates and prepolymers of polyols and polyisocyanates where the isocyanate groups are in excess so that there are free isocyanate groups available to react with additional polyol. The organic polyisocyanates which may be used for the production of polyurethanes include, for example, ethylene diisocyanate, ethylidene diisocyanate, propylene-1,2-diisocyanate, butylene-1,3-diisocyanate, hexylene-1,6-diisocyanate, cyclohexylene-1,2-diisocyanate, and the aromatic polyisocyanates having from 2 to 3 isocyanate groups per molecule and from 1 to 3 phenylene rings as the only aromatic cyclic ring systems such as m-phenylene diisocyanate, 2,4-toluene diisocyanate, 2,6-toluene diisocyanate, 3,3'-dimethyl-, as well as various other polyisocyanates such as 4,4'-biphenylene diisocyanate, 3,3'-dimethoxy-4,4'-biphenylene diisocyanate, 3,3'-diphenyl-4,4'-biphenylene diisocyanate, 3,3'-dichloro-4,4'-biphenylene diisocyanate, triphenylmethane triisocyanate, 1,5-naphthalene diisocyanate, and the like.

Cross-Link Promoters

The cross-link promoters which have been found to be useful in preparing foams in accordance with the present invention include polyfunctional, polyunsaturated acrylates; polyfunctional, polyunsaturated methacrylates; triallyl cyanunate; methyl methacrylate; 1,5-cyclooctadiene and bis(β-chloroethyl) vinyl phosphonate. Mixtures of these cross-link promoters may also be employed in preparing foams in accordance with the present invention. In defining the cross-link promoters the term polyfunctional refers to those materials having a functionality, or number of functional groups, equal to two or more and the term polyunsaturated refers to those materials having two or more double or triple bonds between adjacent carbon atoms. Representative polyfunctional, polyunsaturated acrylates which may be employed as cross-link promoters include, for example, trimethylol propane triacrylate, pentaerythritol tetracrylate, tetraethylene glycol diacrylate, and 1,6-hexanediol diacrylate. Representative polyfunctional, polyunsaturated methacrylates which may be employed in carrying out the present invention include; for example, tetraethylene glycol dimethacrylate, 1,6-hexanediol dimethacrylate, and ethylene glycol dimethacrylate.

Although the amount of cross-link promoter employed has not been found to be narrowly critical to the production of foams in accordance with the present invention, it is preferred to utilize at least 20 parts by weight of the promoter per 100 parts by weight of the polyol in the foam-forming composition. It is especially preferred to employ the cross-link promoter in an amount equal to from about 4.0 to about 12.0 parts by weight based on 100 parts by weight of the polyol. It is also especially preferred to employ, as the cross-link promoter, a polyfunctional, polyunsaturated methacrylate or acrylate.

In addition to the above-identified components, the reaction mixture also contains a suitable catalyst, a blowing agent, and if desired a surfactant. Various other additives may be incorporated in the mixture such as, for example, fillers, pigments, dyes, plasticizers and stabilizers.

Catalyst

The catalysts that may be used to accelerate the foam-forming reaction are those conventionally employed in the preparation of polyurethane foams including, for example, tertiary amines and metal salts.

Representative tertiary amines which may be employed include N-alkylmorpholines, N,N-dialkylcyclohexylamines, triethylamine, tripropylamine, tributylamine, triamylamine, pyridine, quinoline, dimethylpiperidine, dimethylhexahydroaniline, diethylhexahydroaniline, the reaction products of N,N'-diethylaminoethanol and phenyl isocyanate, esterimides, 1-methyl-4-(dimethylaminoethyl) piperazine, N-ethylethyleneimine, N,N,N',N'-tetramethyl-1,3-butanediamine, triethylamine, 2,4,6-tri(dimethylaminomethyl) phenol, tetramethylguanidine, 2-methylpyrazine, dimethylaniline, and nicotine. Suitable metallic compounds include the organic and inorganic salts of bismuth, lead, tin, titanium, iron, antimony, uranium, cadmium, cobalt, thorium, aluminum, mercury, zinc, nickel, cerium, molybdenum, vanadium, copper, manganese and zirconium including, for example, bismuth nitrate, lead 2-ethylhexoate, lead benzoate, lead oleate, sodium trichlorophenate, sodium propionate, lithium acetate, potassium oleate, tetrabutyl tin, butyl tin trichlorate, stannic chloride, tributyl tin 1-nonylphenate, stannous octoate, stannous oleate, dibutyl tin di(2-ethylhexoate), di(2-ethylhexyl) tin oxide, titanium tetrachloride, tetrabutyl titanate, ferric chloride, antimony trichloride, cadmium diethyl dithiophosphate, thorium nitrate, triphenylaluminum, nickelocene, etc. The catalyst component either as a single compound or as a mixture of two or more compounds may be used in conventional amounts, which usually range from about 0.05 to about 4 parts of catalyst per 100 parts of polyolisocyanate reactants by weight.

Blowing Agent

Polyurethanes are used in both the unfoamed and the socalled "foam" form. In general, a foamed polyurethane is formed when low boiling liquids, gaseous blowing agents, or inflatants are generated by or incorporated into, the polyurethane-forming reactants. Often the heat of reaction causes these low boiling liquid or gaseous blowing agents to volatilize, thus foaming the composition. In some cases the boiling point of the blowing agent is chosen to be well below room temperature, and the composition can be made to foam even before any substantial reaction between the polyol and the polyisocyanate reactants has occurred or before any heat is evolved. This technique is sometimes called frothing. Useful blowing agents, i.e., foam inducing agents, which may be added when foams are desired include water, either alone or admixed with other components, e.g., as an aqueous solution of a tertiary amine catalyst, and the chlorinated and fluorinated alkanes having from 1 to about 2 carbon atoms, such as the chlorofluoromethanes and chlorofluoroethanes, which are commercially available under various trademarks, such as E. I. duPont de Nemours & Company, Inc.'s "Freon". The blowing agent is usually carbon dioxide which is formed by the incorporation of water in the composition utilized to produce the foam. The water reacts with an excess of the organic polyisocyanate to generate the necessary carbon dioxide.

Surfactant

When blowing or foaming agents are incorporated into the reactant composition, there may also be incorporated into the mixtures various conventional foam stabilizers to control the amount and quality of the foamed polyurethane obtained. Used for this purpose are various surfactants including various silicone compounds and silicone oil mixtures, e.g., siloxane-oxyalkylene block copolymers sold under various tradenames, such as Union Carbide Corporation's "Silicone L-520". For foaming or blowing polyurethane polymers there may be used from about 2 to about 15 parts by weight of blowing agent and about 0.1 to 3 parts of the foam stabilizing agent per 100 parts by weight of the polyol and polyisocyanate reactants.

All the components may be mixed and the components polymerized in one place. Each of the polyol, polyisocyanate, catalyst and cross-link promoter may be metered and pumped and/or charged into a common mixing vessel and then the resulting mixture may easily be moved to the polymerization side for use in molds, slabstock operations, etc. Alternatively, the cross-link promoter may be mixed with one or more of the reactants, i.e., with the polyol, before mixture with the remaining components. The cross-link promoter may be admixed with the polyol before it is combined with the polyisocyanate reactant or the cross-link promoter may be mixed with the isocyanate before combining such mixture with the polyol reactant. It is preferred to mix the polyol, polyisocyanate and/or catalyst and the cross-link promoter either simultaneously, or to first mix the polyol and/or polyisocyanate with the cross-link promoter and then combine this mixture with the catalyst.

In the art and technology of producing polyurethane foams, it is also known to employ what is commonly referred to as a prepolymer technique. This is a technique wherein part of the reaction involved in making a polyurethane is carried out yielding a prepolymer of increased molecular weight with resultant end groups of either hydroxyls or isocyanates depending upon the stoichiometry used in making this prepolymer. This prepolymer is then used to prepare the desired final polyurethane product by reacting it with either a polyisocyanate or one of the desired polyols, depending, as has been mentioned above, on whether the terminal groups of the prepolymer are hydroxyls or isocyanates, respectively. The prepolymer technique may also be utilized to produce foams in accordance with the present invention.

After the foams are prepared from the compositions described above, they are irradiated by being subjected to a suitable radiation source at a dosage sufficient to modify the properties of the foam. Although applicant does not wish to be bound by any particular theory, it is believed that the present invention may be better understood by the following theoretical consideration as to the effect of the radiation. It is believed that the improved physical properties which have been noted can be explained as caused by non-polar cross-linking—i.e., carbon-to-carbon bonds, which are different from the polar cross-linking normally obtained in polyurethane foams.

Radiation sources which may be employed in carrying out the present invention include any suitable source of ionizing radiation, such as an electron accelerator. By "ionizing radiation" it is meant radiation with sufficient energy to remove an electron from a gas atom, forming an ion pair; this requires an energy of about 32 electron volts (ev.) for each ion pair formed. This radiation has sufficient energy to non-selectively break chemical bonds; thus, in round numbers radiation with energy of 50 ev. and above is effective for the process of this invention. The ionizing radiation preferred for forming free radicals of this invention is high energy ionizing radiation, and has an energy equivalent to at least 0.1 million electron volts (mev.). Higher energies (10 to 15 mev.) are even more effective; the only known upper limit is imposed by available equipment. This radiation is generally classed in two types: high energy particle radiation and high energy ionizing electromagnetic radiation. The effect produced by these two types of radiation is similar, the essential requisite being that the incident particles or photons have sufficient energy to break chemical bonds and generate free radicals.

By "high energy particle radiation" is meant an emission of high energy electrons or nuclear particles such as protons, neutrons, alpha particles, deuterons, or the like, directed so that the said particle impinges upon the foam. The charged particles may be accelerated to high speeds by means of a suitable voltage gradient, using such devices as a resonant cavity accelerator, a Van de Graaff generator, a betatron, a synchrotron, cyclotron, or the like, as is well-known to those skilled in the art. Neutron radiation may be produced by bombardment of selected light metal (e.g., beryllium) targets with high energy positive particles. In addition, particle radiation suitable for carrying out the process of the invention may be obtained from an atomic pile or from radioactive isotopes or from other natural or artificial radioactive material.

By high energy "ionizing electromagnetic radiation" is meant radiation produced when a metal target (e.g., gold or tungsten) is bombarded by electrons possessing appropriate energy. Such energy is imparted to electrons by accelerating potentials in excess of 0.1 million electron volts (mev.), with 0.5 mev. and over preferred. In addition to X-rays produced as indicated above, ionizing electromagnetic radiation suitable for carrying out the process of the invention may be obtained from a nuclear reactor ("pile") or from natural or artificial radioactive material, for example, cobalt 60. In all of these latter cases, the radiation is conventionally termed gamma rays.

The amount of radiation employed can be varied over a wide range depending upon the composition of the foam and the properties desired in the resulting foam product. Radiation dosages are frequently expressed in terms of "megarads" (millions of rads), a "rad" being the amount of high energy radiation of any type which results in an energy absorption of 100 ergs per gram of water or equivalent absorbing material. It has been found that for most applications exposure of the foam at a dosage of from about 3 to about 12 megarads can be employed.

As illustrated in FIG. 1, which is a graph showing the relationship between radiation dosage and tensile strength of the resulting foam, there is an optimum radiation dosage for each foam above which there is no significant increase in the properties of the foam and, in fact, there is often a deterioration of the foam properties.

A significant advantage of the foams produced in accordance with the present invention is the modified properties of the foams. These include increased tensile strength, increased tear strength and improved compression/deflection characteristics. These foams may be used for air filters, fuel cells, sound attenuators for automobiles, aircraft, and office and industrial equipment, interlining for apparel, applicators for cosmetics, soaps and lotions, kitchen products, furniture padding, rug underlay, dental products, disposable items, first-aid products, orthopedic and surgical products, decorative products and poromeric products.

In order to describe the present invention so that it may be more clearly understood, the following examples are set forth. These examples are set forth primarily for the purpose of illustration, and any specific enumeration of detail contained therein should not be interpreted as a limitation on the concept of this invention. All components in the foam-forming compositions are given in parts by weight.

In order to more conveniently describe the components of the foam-forming compositions utilized in the examples, the components are identified by their trademarks or a representative symbol. The trademarks or symbols used in the examples are identified as follows:

F-50 is Fomrez 50, a glycol adipate type polyester polyol available from Witco Chemical Company, New York, New York.

F-3000 is Fomrez ET 3000, a polyoxypropylene glycol type polyether polyol having a molecular weight of about 3000 available from Witco Chemical Company.

L 532 and L 540 are polyoxyalkylene siloxane copolymers available from Union Carbide Corporation, New York, New York.

NEM is N-ethyl morpholine.

C-6 is a 33⅓% solution of stannous octoate in dioctyl phthalate.

T 26 is primarily dibutyltin bis-stearyl-maleate available from M&T Chemicals, Inc., Rahway, New Jersey as Thermolite 26.

T 9 is stannous octoate.

LHT 112 is a polyoxypropylene glycol type polyether polyol having a molecular weight of about 1500 and is available from Union Carbide Corporation.

Dabco 33 LV is a 33⅓% solution of DABCO (1,4 diazobicyclo-[2,2,2] octane) in dipropylene glycol.

PAPI is polymethylene polyphenylisocyanate.

TDI refers to Hylene TM an 80:20 mixture of the 2,4- and 2,6-isomers of toluene diisocyanate available from E. I. duPont de Nemours & Company, Wilmington, Delaware.

The term "index" as used herein, and as commonly used in the polyurethane art, is the ratio of the actual amount of isocyanate in the reaction mixture to the theoretical amount of isocyanate needed for reaction with all the active hydrogen-containing compounds present in the reaction mixture, multiplied by 100.

TMP-TA is trimethylol propane triacrylate
TEG-DMA is tetraethyleneglycol dimethacrylate
PER-TRA is pentaerythritol tetracrylate
TEG-DA is tetraethyleneglycol diacrylate
HD-DA is 1,6-hexanediol dimethacrylate
EG-DMA is ethyleneglycol dimethacrylate
MMA is methyl methacrylate
COD is 1,5 cyclooctadiene
BB is bis($\beta$-chloroethyl) vinyl phosphonate The properties of the radiation cross-linked foams were measured in accordance with the following standard procedures;
Tensile strength—ASTM D1564-64T (Suffix T)
Tear strength—ASTM D1564-64T (Suffix G)
Compression-Deflection—ASTM D1564-64T (Suffix D)
the compression deflection is reported as both (a) the load in pounds/square inch required to compress the foam 25% and (b) the load required to compress the foam 65%.

EXAMPLE I

Several polyurethane foams were prepared by the one-shot method from the compositions given in Table I. The resulting foams are identified as a "control" containing no cross-link promoter and as foams "I-A" through "I-X" each containing a promoter. Samples of each of the resulting foams were then exposed to radiation dosages of 3, 6 and 12 megarads using a three megavolt electron accelerator.

Each foam was then tested to measure its tensile strength, tear strength, and compression-deflection characteristics. The compression-deflection characteristics were measured twice. The first measurement determined the load in pounds/square inch required to compress the foam 25% and the second determine the load required to compress a sample 65%. The results of these tests are given in Table II. As can be seen from this data, not all cross-link promoters increase all properties of all foam systems. However, all of the promoters do, at the least, prevent degradation of the foam such as would otherwise occur upon exposure to ionizing radiation. And, by the appropriate selection of promoters, it is possible to produce foams having any desirable combination of modified properties. The improved tensile strength of several of these foams is illustrated graphically in FIG. 1.

TABLE I

| | CONTROL | I-A | I-B | I-C | I-D | I-E | I-F | I-G | I-H | I-I | I-J | I-K | I-L | I-M |
|---|---|---|---|---|---|---|---|---|---|---|---|---|---|---|
| F-50 | 100 | 100 | 100 | 100 | 100 | 100 | 100 | 100 | 100 | 100 | 100 | 100 | 100 | 100 |
| L532 | 1.0 | 1.0 | 1.0 | 1.0 | 1.0 | 1.0 | 1.0 | 1.0 | 1.0 | 1.0 | 1.0 | 1.0 | 1.0 | 1.0 |
| $H_2O$ | 3.4 | 3.4 | 3.4 | 3.4 | 3.4 | 3.4 | 3.4 | 3.4 | 3.4 | 3.4 | 3.4 | 3.4 | 3.4 | 3.4 |
| NEM | 2.5 | 2.5 | 2.5 | 2.5 | 2.5 | 2.5 | 2.5 | 2.5 | 2.5 | 2.5 | 2.5 | 2.5 | 2.5 | 2.5 |
| C-6 | 0.45 | — | 0.45 | 0.45 | 0.45 | 0.45 | 0.45 | — | — | — | — | — | — | — |
| T-26 | — | — | — | — | — | — | — | 0.25 | — | 0.32 | 0.3 | 0.32 | 0.45 | 0.35 |
| TDX | 44.8 | 44.8 | 44.8 | 44.8 | 44.8 | 44.8 | 44.8 | 44.8 | 44.8 | 44.8 | 44.8 | 44.8 | 44.8 | 44.8 |
| Index | 105 | 105 | 105 | 105 | 105 | 105 | 105 | 105 | 105 | 105 | 105 | 105 | 105 | 105 |
| PROMOTER | | | | | | | | | | | | | | |
| (a) type | — | TEG-DMA | TEG-DMA | TEG-DMA | TMP-TA | TMP-TA | TMP-TA | PER-TRA | PER-TRA | PER-TRA | TEG-DA | TEG-DA | TEG-DA | HD-DA |
| (b) amount | — | 2.8 | 5.6 | 11.2 | 2.8 | 5.6 | 11.2 | 5.6 | 11.2 | 16.8 | 5.6 | 11.2 | 16.8 | 5.6 |

| | I-N | I-O | I-P | I-Q | I-R | I-S | I-T | I-U | I-V | I-W | I-X |
|---|---|---|---|---|---|---|---|---|---|---|---|
| F-50 | 100 | 100 | 100 | 100 | 100 | 100 | 100 | 100 | 100 | 100 | 100 |
| L 532 | 1.0 | 1.0 | 1.0 | 1.0 | 1.0 | 1.0 | 1.0 | 1.0 | 1.0 | 1.0 | 1.0 |
| $H_2O$ | 3.4 | 3.4 | 3.4 | 3.4 | 3.4 | 3.4 | 3.4 | 3.4 | 3.4 | 3.4 | 3.4 |
| NEM | 2.5 | 2.5 | 2.5 | 2.5 | 2.5 | 2.5 | 2.5 | 2.5 | 1.0 | 1.5 | 1.5 |
| C-6 | — | — | — | — | — | — | — | — | — | 2.25 | 1.125 |
| T-26 | 0.45 | 0.75 | 0.35 | 0.55 | 0.75 | 0.35 | 0.45 | .80 | 1.0 | — | — |
| TDI | 44.8 | 44.8 | 44.8 | 44.8 | 44.8 | 44.8 | 44.8 | 44.8 | 44.8 | 44.8 | 44.8 |
| Index | 105 | 105 | 105 | 105 | 105 | 105 | 105 | 105 | 105 | 105 | 105 |
| PROMOTER | | | | | | | | | | | |
| (a) type | HD-DA | HD-DA | HD-DMA | HD-DMA | HD-DMA | EG-DMA | EG-DMA | EG-DMA | MMA | COD | BB |
| (b) amount | 11.2 | 16.8 | 5.6 | 11.2 | 16.8 | 5.6 | 11.2 | 16.8 | 11.2 | 11.2 | 11.2 |

TABLE II

| RADIATION DOSAGE (MEGARADS) | TENSILE STRENGTH | | | | TEAR STRENGTH | | | | COMPRESSION-DEFLECTION (25%) | | | | COMPRESSION-DEFLECTION (65%) | | | |
|---|---|---|---|---|---|---|---|---|---|---|---|---|---|---|---|---|
| | 0 | 3 | 6 | 12 | 0 | 3 | 6 | 12 | 0 | 3 | 6 | 12 | 0 | 3 | 6 | 12 |
| Control | 39.0 | 29.2 | 30.1 | 22.0 | 3.4 | 3.4 | 3.7 | 3.5 | .68 | .78 | .75 | .58 | 2.19 | 1.70 | 1.65 | 1.24 |
| I-A | 32.6 | 29.7 | 29.8 | 30.4 | 3.9 | 3.8 | 4.0 | 3.5 | .82 | .78 | .91 | .83 | 1.46 | 1.27 | 1.50 | 1.47 |
| I-B | 36.3 | 28.9 | 31.0 | 21.6 | 3.9 | 3.3 | 4.0 | 3.7 | .79 | .97 | .82 | .75 | 1.54 | 1.93 | 1.85 | 1.57 |
| I-C | 27.0 | 30.1 | 29.9 | 28.8 | 3.5 | 4.1 | 4.2 | 3.6 | .79 | .81 | .75 | .93 | 1.71 | 1.64 | 1.46 | 1.91 |
| I-D | 27.0 | 30.8 | 30.6 | 30.0 | 3.7 | 4.4 | 4.0 | 3.8 | .84 | .84 | .85 | .84 | 2.09 | 1.84 | 1.95 | 2.11 |
| I-E | 27.8 | 33.7 | 34.6 | 31.2 | 3.8 | 4.3 | 4.4 | 4.2 | .68 | .91 | .85 | .85 | 1.71 | 2.17 | 2.02 | 1.96 |
| I-F | 28.8 | 45.1 | 49.8 | 48.5 | 4.1 | 4.8 | 5.2 | 4.1 | .78 | 1.04 | 1.04 | 1.10 | 1.80 | 2.29 | 2.45 | 2.39 |
| I-G | 35.5 | 28.2 | 28.5 | 25.4 | 4.4 | 4.4 | 3.7 | 3.6 | .96 | 1.89 | 1.20 | 1.16 | 1.73 | 4.06 | 1.78 | 1.83 |
| I-H | 34.0 | 30.6 | 41.8 | 35.7 | 5.0 | 4.2 | 3.4 | 2.6 | .98 | 2.98 | 1.66 | 1.60 | 1.69 | 4.99 | 2.73 | 2.70 |
| I-I | 34.8 | 47.1 | 47.0 | 44.3 | 4.1 | 5.2 | 4.8 | 3.7 | .80 | 2.98 | 1.50 | 1.94 | 1.39 | 5.55 | 2.46 | 3.56 |
| I-J | 26.8 | 23.8 | 25.7 | 26.9 | 2.7 | 2.2 | 2.8 | 3.1 | 1.07 | 2.14 | 1.11 | 1.19 | 1.84 | 4.12 | 2.14 | 2.02 |
| I-K | 28.3 | 32.8 | 38.0 | 34.7 | 3.2 | 3.5 | 3.8 | 3.5 | .87 | 1.83 | .99 | 1.00 | 1.84 | 3.41 | 1.91 | 1.91 |
| I-L | 37.3 | 37.6 | 47.4 | 63.8 | 3.4 | 3.2 | 4.5 | 4.5 | .97 | 2.43 | 1.13 | 1.03 | 1.86 | 4.96 | 2.09 | 1.87 |
| I-M | 28.2 | 31.1 | 34.9 | 32.5 | 2.3 | 3.2 | 3.3 | 3.3 | 1.00 | 2.04 | .98 | 1.06 | 1.92 | 4.04 | 1.77 | 2.10 |
| I-N | 32.0 | 38.3 | 45.4 | 46.0 | 2.5 | 3.3 | 3.9 | 4.5 | .84 | 2.26 | 1.23 | 1.01 | 1.80 | 4.64 | 2.45 | 2.17 |
| I-O | 24.4 | 46.7 | 61.0 | 47.2 | 2.3 | 4.6 | 5.2 | 4.6 | .96 | 2.13 | 1.25 | 1.28 | 1.67 | 3.74 | 2.10 | 2.47 |
| I-P | 32.9 | 29.5 | 31.4 | 33.5 | 3.0 | 3.3 | 3.6 | 3.1 | 1.08 | 2.27 | 1.21 | 1.10 | 2.04 | 4.38 | 2.23 | 1.92 |
| I-Q | 32.7 | 42.9 | 57.4 | 51.1 | 3.5 | 4.3 | 4.7 | 4.5 | .90 | 2.04 | 1.15 | 1.27 | 1.63 | 3.72 | 2.01 | 2.47 |
| I-R | 37.6 | 58.0 | 63.6 | 50.3 | 3.5 | 5.1 | 5.3 | 5.0 | .82 | 1.92 | 1.85 | 1.97 | 1.58 | 3.80 | 3.09 | 3.40 |
| I-S | 34.4 | 36.7 | 40.8 | 34.9 | 3.1 | 3.0 | 3.1 | 3.2 | 1.19 | 2.13 | 1.21 | 1.13 | 2.22 | 3.97 | 2.15 | 2.17 |
| I-T | 33.1 | 49.0 | 57.3 | 48.7 | 3.7 | 3.9 | 5.0 | 4.6 | .98 | 2.10 | 1.22 | 1.37 | 2.02 | 4.63 | 2.24 | 2.51 |
| I-U | 44.0 | 60.8 | 49.4 | 54.3 | 3.5 | 4.2 | 5.0 | 4.4 | 1.54 | 3.10 | 1.94 | 1.90 | 3.12 | 6.17 | 3.69 | 3.90 |
| I-V | 23.7 | — | 38.9 | — | 4.4 | — | 4.9 | — | .75 | — | .84 | — | 1.81 | — | 1.70 | — |
| I-W | 27.2 | — | 35.5 | — | 5.1 | — | 5.0 | — | .93 | — | 1.03 | — | 1.81 | — | 2.14 | — |
| I-X | 22.6 | — | 26.2 | — | 3.9 | — | 4.3 | — | .66 | — | .95 | — | 1.60 | — | 2.10 | — |

EXAMPLE II

Polyurethane foams were prepared from the following compositions comprising a polyether polyol having a molecular weight of about 1500.

| | II-A | II-B |
|---|---|---|
| LHT-112 | 100 | 100 |
| L 540 | 1.0 | 1.0 |
| $H_2O$ | 3.5 | 3.5 |
| NEM | 3.0 | 3.0 |
| C-6 | 0.15 | 0.15 |
| DABCO 33LV | 0.15 | — |
| Aniline | 9.3 | 9.3 |
| PAPI | 93.8 | 93.8 |
| (Index) | (100) | (100) |
| Promoter | | |
| Type | — | TMP-TA |
| Amount | — | 16.2 |

A sample of each of the resulting foams was then exposed to a radiation dosage of 8 megarads employing a three-megavolt electron accelerator as the radiation source.

Each foam was tested as in Example I, both before and after exposure. The results are given below

|  | II-A | II-B |
|---|---|---|
| Tensile strength | | |
| Initial | 18.5 | 11.7 |
| Radiation cross-linked | 17.7 | 25.4 |
| Tear Strength | | |
| Initial | 1.6 | 0.96 |
| Radiation cross-linked | 1.5 | 1.2 |
| Compression deflection (25%) | | |
| Initial | 2.01 | 1.70 |
| Radiation Cross-linked | 2.06 | 2.51 |
| Compression deflection (65%) | | |
| Initial | 4.19 | 4.12 |
| Radiation Cross-linked | 5.10 | 5.45 |

EXAMPLE III

Polyurethane foams were prepared from the following compositions comprising a polyether polyol having a molecular weight of about 1500.

|  | III-A | III-B |
|---|---|---|
| LHT-112 | 100 | 100 |
| L-540 | 1.5 | 1.5 |
| H₂O | 3.5 | 3.5 |
| C-6 | 0.6 | 0.9 |
| Aniline | 9.3 | 9.3 |
| TDI | 70.3 | 70.3 |
| (Index) | (115) | (115) |
| Promoter | | |
| Type | — | TMP-TA |
| Amount | — | 14.1 |

A sample of each of the resulting foams was then exposed to a radiation dosage of 8 megarads employing a three megavolt electron accelerator as the radiation source.

Each foam was tested as in Example I, both before and after exposure. The results are given below.

|  | III-A | III-B |
|---|---|---|
| Tensile strength | | |
| Initial | 24.5 | 22.9 |
| Radiation Cross-Linked | 24.2 | 38.5 |
| Tear Strength | | |
| Initial | 2.0 | 1.5 |
| Radiation Cross-Linked | 2.4 | 2.8 |
| Compression Deflection (25%) | | |
| Initial | 1.60 | 1.30 |
| Radiation Cross-Linked | 1.55 | 1.90 |
| Compression Deflection (65%) | | |
| Initial | 3.40 | 2.40 |
| Radiation Cross-Linked | 2.78 | 3.12 |

EXAMPLE IV

Polyurethane foams were prepared from the following compositions comprising a polyether polyol having a molecular weight of about 1500.

|  | IV-A | IV-B |
|---|---|---|
| LHT 112 | 100 | 100 |
| L 540 | 1.5 | 1.5 |
| H₂O | 3.5 | 3.5 |
| NEM | 2.0 | 2.0 |
| C-6 | — | 0.75 |
| T-9 | 0.25 | — |
| TDI | 47.4 | 47.4 |
| (Index) | (100) | (100) |
| Promoter | | |
| Type | — | TMP-TA |
| Amount | — | 11.7 |

A sample of each of the resulting foams was then exposed to a radiation dosage of 8 megarads employing a three megavolt electron accelerator as the radiation source.

Each foam was tested as in Example I, both before and after exposure. The results are given below.

|  | IV-A | IV-B |
|---|---|---|
| Tensile strength | | |
| Initial | 19.8 | 13.5 |
| Radiation Cross-Linked | 18.2 | 25.9 |
| Tear Strength | | |
| Initial | 1.9 | 1.4 |
| Radiation Cross-Linked | 1.6 | 2.8 |
| Compression-deflection (25%) | | |
| Initial | .46 | .78 |
| Radiation Cross-Linked | .36 | .38 |
| Compression-deflection (65%) | | |
| Initial | .79 | 1.30 |
| Radiation Cross-Linked | .59 | .64 |

EXAMPLE V

A polyurethane foam was prepared from the following composition comprising a mixture of a polyester polyol and a polyether polyol having a molecular weight of about 3000.

| F-50 | 80 |
|---|---|
| F-3000 | 20 |
| L 540 | 2.5 |
| H₂O | 3.4 |
| NEM | 1.0 |
| C-6 | 2.4 |
| TDI | 44.8 |
| (Index) | (105) |
| Promoter | |
| Type | TMP-TA |
| Amount | 11.2 |

A sample of the foam was then exposed to a radiation dosage of 6 megarads employing a three megavolt electron accelerator as the radiation source.

The foam was tested as in Example I, both before and after exposure. The results are given below.

| Tensile strength | |
|---|---|
| Initial | 14.9 |
| Radiation Cross-Linked | 18.0 |
| Tear Strength | |

-continued

| | |
|---|---|
| Initial | 2.9 |
| Radiation Cross-Linked | 3.6 |
| Compression-deflection (25%) | |
| Initial | .40 |
| Radiation Cross-Linked | .53 |
| Compression-deflection (65%) | |
| Initial | .83 |
| Radiation Cross-Linked | 1.10 |

What is claimed is:

1. A method of preparing a polyurethane foam having modified properties which comprises
   (a) incorporating in the foam-forming composition employed to produce said foam and comprising a polyol selected from the group consisting of polyester polyols, polyether polyols having a molecular weight of about 1500 or less and mixtures of polyester polyols and polyether polyols wherein the polyester polyol has a molecular weight of from about 400 to about 5000 and the polyether polyol has a molecular weight of from about 250 to about 6500 and an organic polyisocyanate, at least one cross-link promoter selected from the group consisting of polyfunctional, polyunsaturated acrylates; polyfunctional, polyunsaturated methacrylates; triallyl cyanurate; methyl methacrylates; 1,5--cyclooctadiene; and bis (β-chloroethyl) vinyl phosphonate,
   (b) allowing the composition to foam, and
   (c) subjecting said foam to ionizing radiation at a dosage sufficient to modify the properties of said foam.

2. A process for preparing a polyurethane foam having modified properties, as claimed in claim 1, wherein the radiation source is an electron accelerator.

3. A process for preparing a polyurethane foam having modified properties, as claimed in claim 1, wherein the radiation dosage applied to the foam is equal to from about 3 to about 12 megarads.

4. The polyurethane foam produced according to the method of claim 1.

5. The polyurethane foam, claimed in claim 4, wherein the cross-link promoter is selected from the group consisting of trimethylol propane triacrylate, pentaerythritol tetracrylate, tetraethylene glycol diacrylate and 1,6-hexanediol diacrylate.

6. The polyurethane foam, claimed in claim 4, wherein the cross-link promoter is a polyfunctional, polyunsaturated methacrylate.

7. The polyurethane foam, claimed in claim 6, wherein the cross-link promoter is selected from the group consisting of tetraethylene glycol dimethacrylate, 1,6-hexanediol dimethacrylate and ethylene glycol dimethacrylate.

8. The polyurethane foam, claimed in claim 4, wherein the amount of cross-link promoter is equal to at least 2.0 parts by weight based on 100 parts by weight of the polyol in said foam.

9. The polyurethane foam, claimed in claim 8, wherein the amount of cross-link promoter is equal to from about 4.0 parts to about 12.0 parts by weight based on 100 parts by weight of the polyol in said foam.

10. The polyurethane foam, claimed in claim 4, wherein the polyol is a polyester polyol.

* * * * *